United States Patent
Wasden et al.

(10) Patent No.: US 9,049,354 B2
(45) Date of Patent: Jun. 2, 2015

(54) METHOD AND SYSTEM FOR MONITORING AND CONTROLLING A BACK-UP RECEIVER IN LOCAL COLLECTION FACILITY FROM A REMOTE FACILITY USING AN IP NETWORK

(75) Inventors: Mitchell B. Wasden, Redondo Beach, CA (US); Vishal Arya, Los Angeles, CA (US); Daniel M. Miner, Redondo Beach, CA (US); Darren M. St. Laurent, Stevenson Ranch, CA (US); David T. Boltz, La Mirada, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1162 days.

(21) Appl. No.: 11/929,373

(22) Filed: Oct. 30, 2007

(65) Prior Publication Data

US 2009/0110052 A1    Apr. 30, 2009

(51) Int. Cl.
*H04B 1/44*  (2006.01)
*H04N 7/20*  (2006.01)
(Continued)

(52) U.S. Cl.
CPC .............. *H04N 7/20* (2013.01); *H04H 20/06* (2013.01); *H04H 20/12* (2013.01);
(Continued)

(58) Field of Classification Search
CPC .............. H04H 20/02; H04N 21/2221; H04N 21/2665; H04N 21/6143; H04N 21/64322; H04N 21/64707
USPC .......................................................... 455/78
See application file for complete search history.

(56) References Cited

U.S. PATENT DOCUMENTS

| | | |
|---|---|---|
| 4,317,010 A | 2/1982 | Fillot |
| 4,984,252 A | 1/1991 | Morimoto |

(Continued)

FOREIGN PATENT DOCUMENTS

WO     03/058967 A1    7/2003

OTHER PUBLICATIONS

"Specification for the use of Video and Audio Coding in DVB services delivered directly over IP protocols" DVB Document A084 Rev. 2, May 2007.*

(Continued)

*Primary Examiner* — David Bilodeau (57) ABSTRACT

A system and method suitable for collecting local television signals includes a local collection facility having a plurality of primary receiver circuit modules with a first receiver circuit module and a back-up receiver module. The local collection facility includes the first receiver circuit module receiving and demodulating the first channel signal and forming a first IP signal. The first receiver has a first multicast group. The back-up receiver circuit module receives and demodulates the first channel signal and forming a second signal. The back-up receiver has a second multicast group. A remote facility is spaced apart from the local collection facility and communicates with the local collection facility through an IP backhaul. A primary decoder within the remote facility is communication with the IP backhaul and forms a decoded signal from the first IP signal. The primary decoder belongs to the first multicast group. A primary encoder within the remote facility communicates with the primary decoder and forms a first encoded signal from the decoded signal. A multiplexer multiplexes the first encoded signal into a multiplexed signal. A monitoring system includes commanding the primary decoder to join the second multicast group and discontinue the first multicast group. The primary decoder forms the decoded signal from the second IP signal.

25 Claims, 8 Drawing Sheets

(51) Int. Cl.

| | | |
|---|---|---|
| H04H 20/06 | (2008.01) | |
| H04H 20/12 | (2008.01) | |
| H04N 7/173 | (2011.01) | |
| H04N 21/222 | (2011.01) | |
| H04N 21/2365 | (2011.01) | |
| H04N 21/2665 | (2011.01) | |
| H04N 21/61 | (2011.01) | |

(52) U.S. Cl.
CPC ...... *H04N 7/17318* (2013.01); *H04N 21/2221* (2013.01); *H04N 21/2365* (2013.01); *H04N 21/2665* (2013.01); *H04N 21/6143* (2013.01); *H04N 21/6175* (2013.01)

(56) References Cited

U.S. PATENT DOCUMENTS

| | | | |
|---|---|---|---|
| 5,155,483 A | 10/1992 | Morimoto | |
| 5,189,516 A | 2/1993 | Angell et al. | |
| 5,257,106 A | 10/1993 | Maruoka | |
| 5,323,322 A | 6/1994 | Mueller et al. | |
| 5,327,421 A | 7/1994 | Hiller et al. | |
| 5,351,130 A | 9/1994 | Dugan et al. | |
| 5,452,297 A | 9/1995 | Hiller et al. | |
| 5,463,656 A | 10/1995 | Polivka et al. | |
| 5,499,046 A | 3/1996 | Schiller et al. | |
| 5,513,180 A | 4/1996 | Miyake et al. | |
| 5,524,113 A | 6/1996 | Gaddis | |
| 5,566,353 A | 10/1996 | Cho et al. | |
| 5,583,562 A | 12/1996 | Birch et al. | |
| 5,600,573 A * | 2/1997 | Hendricks et al. | 725/109 |
| 5,640,673 A | 6/1997 | Tanabe | |
| 5,646,675 A | 7/1997 | Copriviza et al. | |
| 5,659,350 A | 8/1997 | Hendricks et al. | |
| 5,666,293 A | 9/1997 | Metz et al. | |
| 5,666,487 A | 9/1997 | Goodman et al. | |
| 5,684,714 A | 11/1997 | Yogeshwar et al. | |
| 5,708,961 A | 1/1998 | Hylton et al. | |
| 5,793,413 A | 8/1998 | Hylton et al. | |
| 5,926,230 A | 7/1999 | Nijima et al. | |
| 5,930,251 A | 7/1999 | Murakami et al. | |
| 5,933,123 A | 8/1999 | Kaul | |
| 5,949,766 A | 9/1999 | Ibanez-Meier et al. | |
| 5,999,518 A | 12/1999 | Nattkemper et al. | |
| 6,047,162 A | 4/2000 | Lazaris-Brunner et al. | |
| 6,154,772 A | 11/2000 | Dunn et al. | |
| 6,272,137 B1 | 8/2001 | Noiri | |
| 6,308,286 B1 | 10/2001 | Richmond et al. | |
| 6,373,817 B1 | 4/2002 | Kung et al. | |
| 6,400,720 B1 | 6/2002 | Ovadia et al. | |
| 6,401,242 B1 | 6/2002 | Eyer et al. | |
| 6,434,562 B1 | 8/2002 | Pennywitt et al. | |
| 6,490,273 B1 | 12/2002 | DeNap et al. | |
| 6,496,522 B1 | 12/2002 | Takizawa et al. | |
| 6,510,163 B1 | 1/2003 | Won | |
| 6,529,146 B1 | 3/2003 | Kowalski et al. | |
| 6,557,031 B1 | 4/2003 | Mimura et al. | |
| 6,625,811 B1 | 9/2003 | Kaneko | |
| 6,654,923 B1 | 11/2003 | Grenier et al. | |
| 6,724,760 B2 | 4/2004 | Uchida | |
| 6,724,774 B1 | 4/2004 | Sashide | |
| 6,741,553 B1 | 5/2004 | Grenier | |
| 6,751,214 B1 | 6/2004 | Parruck et al. | |
| 6,782,550 B1 | 8/2004 | Cao | |
| 6,795,506 B1 | 9/2004 | Zhang et al. | |
| 6,796,555 B1 | 9/2004 | Blahut | |
| 6,873,877 B1 | 3/2005 | Tobias et al. | |
| 6,910,078 B1 | 6/2005 | Raman et al. | |
| 6,963,547 B1 | 11/2005 | Kwak et al. | |
| 7,039,116 B1 | 5/2006 | Zhang et al. | |
| 7,039,937 B1 | 5/2006 | Glenn | |
| 7,072,365 B1 | 7/2006 | Ansley | |
| 7,080,398 B1 | 7/2006 | Wichelman et al. | |
| 7,088,981 B2 | 8/2006 | Chang | |
| 7,133,377 B1 | 11/2006 | Mullins et al. | |
| 7,212,738 B1 | 5/2007 | Wang | |
| 7,219,367 B2 | 5/2007 | Briggs | |
| 7,224,837 B2 | 5/2007 | Olshansky et al. | |
| 7,260,369 B2 | 8/2007 | Feher | |
| 7,302,224 B2 | 11/2007 | Sibley et al. | |
| 7,315,887 B1 | 1/2008 | Liang et al. | |
| 7,333,425 B2 | 2/2008 | Huck et al. | |
| 7,346,918 B2 * | 3/2008 | Hennenhoefer et al. | 725/74 |
| 7,380,264 B2 | 5/2008 | Potrebic | |
| 7,460,832 B2 | 12/2008 | Lee et al. | |
| 7,493,648 B2 | 2/2009 | Hisamatsu et al. | |
| 7,525,993 B2 | 4/2009 | Yousef | |
| 7,529,276 B1 | 5/2009 | Ramakrishnan | |
| 7,596,350 B1 | 9/2009 | Ladrach | |
| 7,602,846 B1 | 10/2009 | Wu et al. | |
| 7,607,154 B2 | 10/2009 | Morello | |
| 7,650,620 B2 | 1/2010 | Fish et al. | |
| 7,746,791 B2 | 6/2010 | Wimmer | |
| 8,139,517 B2 | 3/2012 | Oger et al. | |
| 2001/0003846 A1 * | 6/2001 | Rowe et al. | 725/47 |
| 2001/0026537 A1 * | 10/2001 | Massey | 370/316 |
| 2001/0036198 A1 | 11/2001 | Arsenault et al. | |
| 2002/0007494 A1 | 1/2002 | Hodge | |
| 2002/0053049 A1 | 5/2002 | Shiomoto et al. | |
| 2002/0061023 A1 | 5/2002 | Takizawa et al. | |
| 2002/0105976 A1 * | 8/2002 | Kelly et al. | 370/519 |
| 2002/0150061 A1 | 10/2002 | Arsenault | |
| 2002/0186320 A1 | 12/2002 | Carlsgaard et al. | |
| 2002/0194596 A1 | 12/2002 | Srivastava | |
| 2003/0007564 A1 | 1/2003 | Jeong | |
| 2003/0018975 A1 | 1/2003 | Stone | |
| 2003/0028897 A1 | 2/2003 | Brooks | |
| 2003/0088873 A1 | 5/2003 | McCoy et al. | |
| 2003/0095554 A1 | 5/2003 | Shimizu | |
| 2003/0140353 A1 | 7/2003 | Hugenberg et al. | |
| 2003/0161262 A1 | 8/2003 | Hosoi | |
| 2003/0196211 A1 | 10/2003 | Chan | |
| 2003/0217362 A1 * | 11/2003 | Summers et al. | 725/63 |
| 2004/0001478 A1 | 1/2004 | Wong | |
| 2004/0022275 A1 | 2/2004 | Blanchard | |
| 2004/0022535 A1 * | 2/2004 | Wang et al. | 398/2 |
| 2004/0078807 A1 | 4/2004 | Fries et al. | |
| 2004/0117831 A1 | 6/2004 | Ellis et al. | |
| 2004/0120349 A1 | 6/2004 | Border et al. | |
| 2004/0181813 A1 | 9/2004 | Ota et al. | |
| 2004/0213247 A1 | 10/2004 | Seki et al. | |
| 2004/0216171 A1 | 10/2004 | Barone et al. | |
| 2004/0234145 A1 | 11/2004 | Yatabe et al. | |
| 2004/0255333 A1 | 12/2004 | Kenworthy | |
| 2005/0002339 A1 | 1/2005 | Patil et al. | |
| 2005/0076134 A1 | 4/2005 | Bialik et al. | |
| 2005/0086696 A1 | 4/2005 | Daniels | |
| 2005/0099969 A1 | 5/2005 | Roberts et al. | |
| 2005/0155079 A1 | 7/2005 | Chen et al. | |
| 2005/0160477 A1 | 7/2005 | Saito | |
| 2005/0175085 A1 | 8/2005 | Bergen et al. | |
| 2005/0210123 A1 | 9/2005 | Wang et al. | |
| 2005/0210133 A1 | 9/2005 | Florissi et al. | |
| 2005/0240967 A1 | 10/2005 | Anderson et al. | |
| 2006/0018254 A1 * | 1/2006 | Sanders et al. | 370/216 |
| 2006/0035610 A1 | 2/2006 | Potrebic | |
| 2006/0050184 A1 | 3/2006 | McMiller et al. | |
| 2006/0064726 A1 * | 3/2006 | Loner | 725/68 |
| 2006/0085834 A1 | 4/2006 | Chang et al. | |
| 2006/0098735 A1 | 5/2006 | Chang | |
| 2006/0126634 A1 | 6/2006 | Park | |
| 2006/0166699 A1 | 7/2006 | Aghvami et al. | |
| 2006/0198389 A1 | 9/2006 | Eriokson et al. | |
| 2006/0242674 A1 | 10/2006 | Medford et al. | |
| 2007/0002851 A1 | 1/2007 | Paila et al. | |
| 2007/0022438 A1 | 1/2007 | Arsenau et al. | |
| 2007/0040933 A1 | 2/2007 | Seong | |
| 2007/0053379 A1 | 3/2007 | Hershey et al. | |
| 2007/0079351 A1 | 4/2007 | Wang et al. | |
| 2007/0091857 A1 | 4/2007 | Elstermann | |
| 2007/0094691 A1 | 4/2007 | Gazdzinski | |
| 2007/0136765 A1 | 6/2007 | Shah et al. | |
| 2007/0136777 A1 | 6/2007 | Hasek et al. | |
| 2007/0157281 A1 | 7/2007 | Ellis et al. | |

(56) References Cited

U.S. PATENT DOCUMENTS

| | | |
|---|---|---|
| 2007/0162927 A1 | 7/2007 | Ramaswamy et al. |
| 2007/0186251 A1 | 8/2007 | Horowitz et al. |
| 2007/0204300 A1 | 8/2007 | Markley et al. |
| 2007/0204311 A1 | 8/2007 | Hasek et al. |
| 2007/0261073 A1* | 11/2007 | Blumenschein et al. ....... 725/19 |
| 2007/0263627 A1 | 11/2007 | Karino et al. |
| 2007/0268817 A1 | 11/2007 | Smallegange et al. |
| 2007/0291713 A1 | 12/2007 | Machida |
| 2008/0066096 A1 | 3/2008 | Wollmershauser et al. |
| 2008/0069155 A1 | 3/2008 | Honhart |
| 2008/0101455 A1 | 5/2008 | Scheelke |
| 2008/0102750 A1 | 5/2008 | Keener et al. |
| 2008/0137543 A1 | 6/2008 | Mitra |
| 2008/0201748 A1 | 8/2008 | Hasek et al. |
| 2008/0282011 A1 | 11/2008 | Tsai et al. |
| 2008/0291907 A1 | 11/2008 | Rogasch |
| 2009/0022241 A1 | 1/2009 | Fukuoka et al. |
| 2009/0025027 A1 | 1/2009 | Craner |
| 2009/0052323 A1 | 2/2009 | Breynaert et al. |
| 2009/0066848 A1* | 3/2009 | St. Laurent et al. .......... 348/731 |
| 2009/0067365 A1 | 3/2009 | Pham et al. |
| 2009/0067432 A1* | 3/2009 | St. Laurent et al. ....... 370/395.1 |
| 2009/0067433 A1* | 3/2009 | St. Laurent et al. ....... 370/395.1 |
| 2009/0067490 A1 | 3/2009 | Barroso |
| 2009/0069021 A1 | 3/2009 | Barroso |
| 2009/0070824 A1 | 3/2009 | Barroso |
| 2009/0070825 A1* | 3/2009 | Pham et al. ..................... 725/68 |
| 2009/0070830 A1* | 3/2009 | Pham et al. ..................... 725/71 |
| 2009/0070846 A1* | 3/2009 | St. Laurent et al. .......... 725/131 |
| 2009/0109836 A1* | 4/2009 | Wasden et al. ................ 370/216 |
| 2009/0109883 A1* | 4/2009 | Wasden et al. ................ 370/310 |
| 2009/0110052 A1* | 4/2009 | Wasden et al. ........... 375/240.01 |
| 2009/0113490 A1* | 4/2009 | Wasden et al. .................. 725/67 |
| 2009/0213814 A1 | 8/2009 | Heo et al. |
| 2009/0254962 A1 | 10/2009 | Hendricks et al. |
| 2010/0208595 A1 | 8/2010 | Zhao et al. |

OTHER PUBLICATIONS

Non-final Office action dated Aug. 4, 2010 in U.S. Appl. No. 11/929,252, filed Oct. 30, 2007 by Mitchell B. Wasden et al.
"Specification for the Use of Video and Audio Coding in DVB Services Delivered Directly Over IP Protocols"; DVB Document Rev. 2; May 2007.

* cited by examiner

METHOD AND SYSTEM FOR MONITORING AND CONTROLLING A BACK-UP RECEIVER IN LOCAL COLLECTION FACILITY FROM A REMOTE FACILITY USING AN IP NETWORK

TECHNICAL FIELD

The present disclosure relates generally to communication systems, and more particularly to a method and system for monitoring and controlling the switching of a back-up receiver module at a local collection facility from a remote facility of a signal collection and uplinking system.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers. Providing reliable signals reduces the overall cost of the system by reducing the number of received calls at a customer call center.

In satellite broadcasting systems, users have come to expect the inclusion of local channels in addition to the channels broadcast for the entire Continental United States. Collecting the channels may be performed in various manners, including providing a manned station that receives the signals. The signals may be uplinked from various locations. Providing manned stations increases the labor costs and thus increases the overall cost of the service.

SUMMARY

The present disclosure provides a means for monitoring and controlling a local signal collection system from a central facility. The local collection facility is suitable for receiving local television channels.

In one aspect of the invention, a method of forming an output signal includes providing a plurality of primary receiver circuit modules at a local collection facility. The plurality of primary receiver circuit modules comprises a first receiver circuit module. The method further includes receiving a plurality of channel signals. The plurality of channel signals has a first channel signal. The method also includes communicating the first channel signal to the first receiver circuit module and a second receiver circuit module, forming a first IP signal corresponding to the first channel signal at the first receiver circuit module, communicating the first IP signal corresponding to the first channel signal from the local collection facility through the IP network backhaul to the remote facility, decoding the IP signal to form a first decoded signal, encoding the first decoded signal at a first encoder module into a first encoded signal, multiplexing the first encoded signal into a first multiplexed signal, generating the output signal at the remote facility in response to the multiplexed signal and providing a plurality of back-up receiver circuit modules at the local collection facility. Each of said plurality of back-up receiver circuit modules corresponds to a respective one of the plurality of primary circuit modules. The plurality of back-up receiver circuit modules includes a second receiver circuit module forming a second IP signal from the first channel signal. The method also includes previewing a second receiver circuit module by communicating the second IP signal corresponding to the first channel signal from the local collection facility through the IP network backhaul to the remote facility and when the second IP signal is acceptable, discontinuing the steps of decoding the first IP signal to form a first decoded signal, encoding the first decoded signal at a first encoder module into a first encoded signal, multiplexing the first encoded signal into a first multiplexed signal and generating the output signal at the remote facility in response to the multiplexed signal. The method also includes decoding the second IP signal to form a second decoded signal, encoding the second decoded signal at the first encoder module into a second encoded signal, multiplexing the second encoded signal into a second multiplexed signal and generating the output signal at the remote facility in response to the second multiplexed signal.

In a further aspect of the invention, a system suitable for collecting local television signals includes a local collection facility having a plurality of primary receiver circuit modules with a first receiver circuit module and a back-up receiver module. The local collection facility includes the first receiver circuit module receiving and demodulating the first channel signal and forming a first IP signal. The first receiver has a first multicast group. The back-up receiver circuit module receives and demodulates the first channel signal and forming a second signal. The back-up receiver has a second multicast group. A remote facility is spaced apart from the local collection facility and communicates with the local collection facility through an IP backhaul. A primary decoder within the remote facility is communication with the IP backhaul and forms a decoded signal from the first IP signal. The primary decoder belongs to the first multi-cast group. A primary encoder within the remote facility communicates with the primary decoder and forms a first encoded signal from the decoded signal. A multiplexer multiplexes the first encoded signal into a multiplexed signal. A monitoring system includes commanding the primary decoder to join the second multicast group and discontinue the first multicast group. The primary decoder forms the decoded signal from the second IP signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is described with respect to a satellite television system. However, the present disclosure may have various uses including satellite data transmission and reception for home or business uses. The system may also be used in a cable system or wireless terrestrial communication system.

Figure 1:
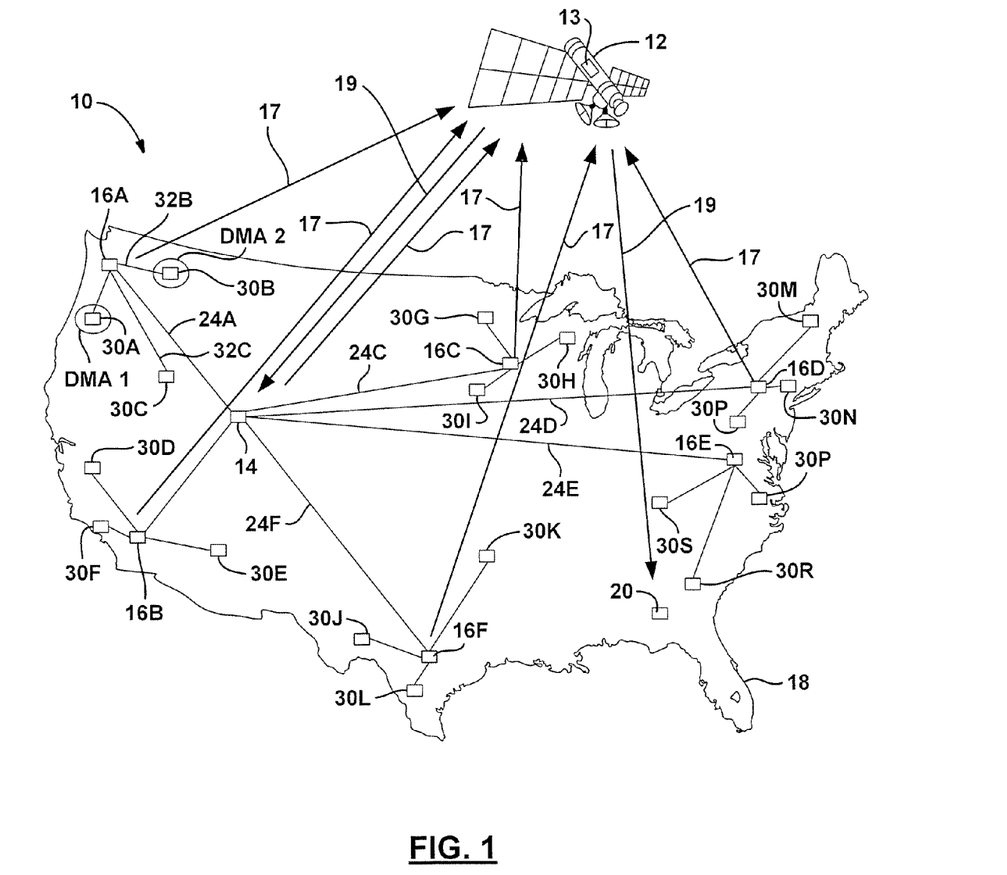
FIG. 1 is an overall system view of a collection and communication system in the continental United States.

Referring now to FIG. 1, a collection and communication system 10 includes a satellite 12 that includes at least one transponder 13. Typically, multiple transponders are in a satellite. Although only one satellite is shown, more than one is possible or even likely.

The collection and communication system 10 includes a central facility or Network operations center (NOC) 14 and a plurality of regional or remote uplink facilities (RUF) 16A, 16B, 16C, 16D, 16E and 16F. In a non-satellite system the facilities may be referred to as a remote facility. The regional or remote uplink facilities 16A-16F may be located at various locations throughout a landmass 18 such as the continental United States, including more or less than those illustrated. The regional or remote uplink facilities 16A-16F uplink various uplink signals 17 to satellite 12. The satellites downlink signals 19 to various users 20 that may be located in different areas of the landmass 18. The users 20 may be mobile or fixed users. The uplink signals 17 may be digital signals such as digital television signals or digital data signals. The digital television signals may be high definition television signals, standard definition signals or combinations of both. Uplinking may be performed at various frequencies including Ka band. The present disclosure, however, is not limited to Ka band. However, Ka band is a suitable frequency example used throughout this disclosure. The central facility or NOC 14 may also receive downlink signals 19 corresponding to the uplink signals 17 from the various regional or remote uplink facilities and from itself for monitoring purposes. The central facility 14 may monitor and control the quality of all the signals broadcast from the system 10.

The central facility 14 may also be coupled to the regional or remote uplink facilities through a network such as a computer network having associated communication lines 24A-24F. Each communication line 24A-F is associated with a respective regional or remote uplink site 16. Communication lines 24A-24F are terrestrial-based lines. As will be further described below, all of the functions performed at the regional or remote uplink facilities may be controlled centrally at the central facility 14 as long as the associated communication line 24A-F is not interrupted. When a communication line 24A-F is interrupted, each regional or remote uplink site 16A-F may operate autonomously so that uplink signals may continually be provided to the satellite 12. Each of the regional or remote uplink and central facilities includes a transmitting and receiving antenna which is not shown for simplicity in FIG. 1.

Each of the regional or remote uplink facilities 16A-16F may also be in communication with a local collection facility collectively referred to with reference numeral 30. As illustrated in FIG. 1, three local collection facilities are associated with each remote uplink facility 16. For example, remote uplink facility 16A has local collection facilities 30A, 30B and 30C associated therewith. Local collection facilities 30D-30S are associated with one of the other remote uplink facilities 16B-16F. Although only three local collection facilities are illustrated for each remote uplink facility 16, numerous local collection facilities may be associated with each remote uplink facility 16. The number of local collection facilities 30 may be numerous, such as 40 for each remote uplink facility. The number of local collection facilities 30 is limited by the amount of equipment and the capabilities thereof associated with each remote uplink facility 16.

The local collection facilities 30 are used for collecting local television stations in various designated marketing areas (DMAs). As is illustrated, local collection facility 30A is located in DMA1 and local collection facility 30B is located in DMA2. For simplicity, only two DMAs are illustrated. However, each local collection facility may be located in a DMA.

The local collection facilities 30 may be in communication with each remote uplink facility 16 through a communication network 32. As will be described below, the communication network 32 may be an Internet protocol (IP) network. The signals from the local collection facilities 30 may thus be video-over-IP signals. Each of the remote uplink facilities 16 are in communication with each local collection facility 30 through the communication network 32. As is illustrated, local collection facility 30A is in communication with the remote uplink facility 16A through communication network 32A, while local collection facility 30B is in communication with the remote uplink facility 16A through communication network 32B, and so on.

Figure 2:
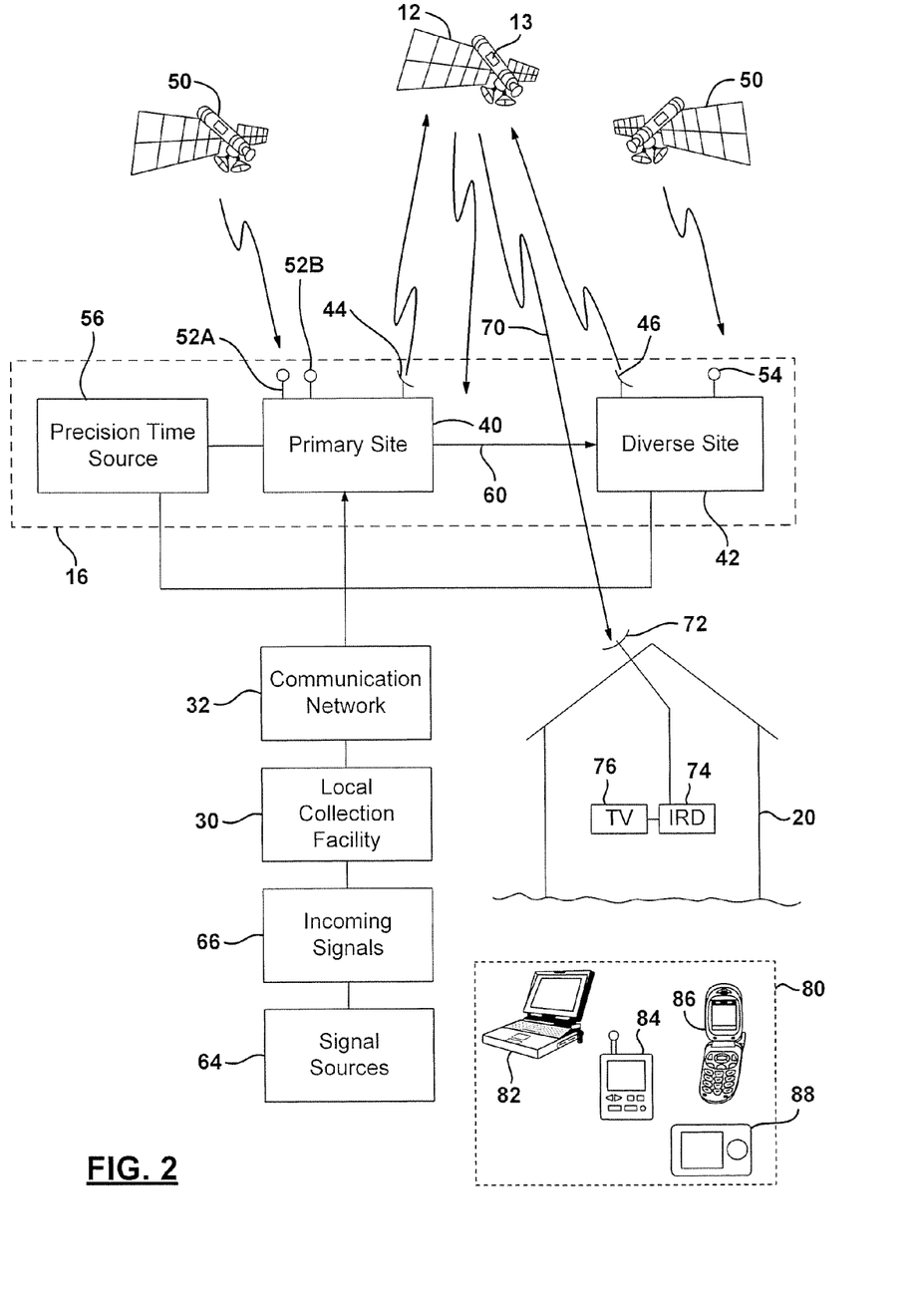
FIG. 2 is a system view at the regional level of the collection and communication system.

Referring now to FIG. 2, the regional or remote uplink facilities 16A-16F of FIG. 1 are illustrated collectively as reference numeral 16. The regional facilities 16 may actually comprise two facilities that include a primary site 40 (such as the remote uplink facility 16 above) and a diverse site 42. The primary site 40 may be referred to as a primary broadcast center (PBC). As will be described below, the central site 14 may also include a primary site and diverse site as is set forth herein. The primary site 40 and diverse site 42 of both the central and regional sites may be separated by at least 25 miles, or, more even more such as, at least 40 miles. In one constructed embodiment, 50 miles was used. The primary site 40 includes a first antenna 44 for transmitting and receiving signals to and from satellite 12. Diverse site 42 also includes an antenna 46 for transmitting and receiving signals from satellite 12.

Primary site 40 and diverse site 42 may also receive signals from GPS satellites 50. GPS satellites 50 generate signals corresponding to the location and a precision timed signal that may be provided to the primary site 40 through an antenna 52 and to the diverse site 42 through an antenna 54. It should be noted that redundant GPS antennas (52A,B) for each site may be provided. In some configurations, antennas 44 and 46 may also be used to receive GPS signals.

A precision time source 56 may also be coupled to the primary site 40 and to the diverse site 42 for providing a precision time source. The precision time source 56 may include various sources such as coupling to a central atomic clock. The precision time source 56 may be used to trigger certain events such as advertising insertions and the like.

The primary site 40 and the diverse site 42 may be coupled through a communication line 60. Communication line 60 may be a dedicated communication line. The primary site 40 and the diverse site 42 may communicate over the communication line using a video-over-Internet protocol (IP).

Various signal sources 64 such as an optical fiber line, copper line or antennas may provide incoming signals 66 to the local collection facility 30. Incoming signal 66, as mentioned above, may be television signals. The television signals may be over-the-air high-definition signals, over-the-air standard television signals, or high or standard definition signals received through a terrestrial communication line. The incoming signals 66 such as the television signals may be routed from the local collection facility 30 through the communication network 30 to the primary site 40, or the diverse site 42 in the event of a switchover. The switchover may be manual or a weather-related automatic switchover. A manual switchover, for example, may be used during a maintenance condition.

Users 20 receive downlink signals 70 corresponding to the television signals. Users 20 may include home-based systems, business-based systems or multiple dwelling unit systems. As illustrated, a user 20 has a receiving antenna 72 coupled to an integrated receiver decoder (IRD) 74 that processes the signals and generates audio and video signals corresponding to the received downlink signal 70 for display on the television or monitor 76. It should also be noted that satellite radio receiving systems may also be used in place of the IRD 74. The integrated receiver decoder 74 may be incorporated into or may be referred to as a set top box.

The user 20 may also be a mobile user. The user 20 may therefore be implemented in a mobile device or portable device 80. The portable device 80 may include but are not limited to various types of devices such as a laptop computer 82, a personal digital assistant 84, a cellular telephone 86 or a portable media player 88.

Figure 3:
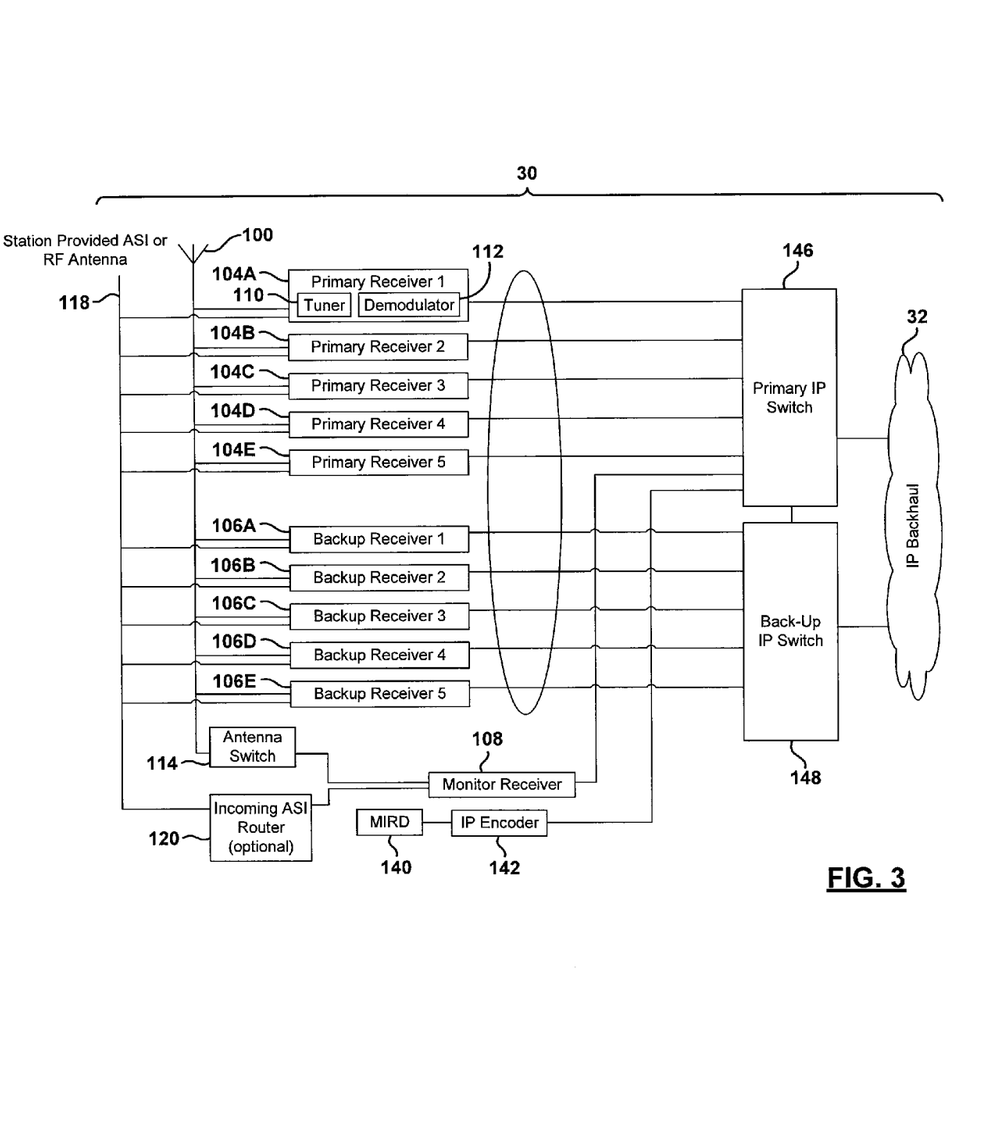
FIG. 3 is a detailed block diagrammatic view of a local collection facility illustrated in FIGS. 1 and 2.

Referring now to FIG. 3, the local collection facility 30 is illustrated in more detail adjacent to the remote uplink facility (RUF) 16. Several remote facilities may be directed to one remote uplink facility. Several remote uplink facilities may be located across the country. As mentioned above, the local collection facility 30 is in communication with the remote uplink facility 16 through a network 32 such as an IP network. The local collection facility 30 is used for collecting signals in a designated marketing area or other area. The channel signals may be received as over-the-air television signals or through a direct local feed such as an optical fiber or wire. For an over-the-air signal, an antenna or plurality of antennas 100 are provided. The antenna channel signals are directed a plurality of primary receiver circuit modules 104A-E (collectively referred to as 104). The number of receiver circuit modules 104 depends upon various design parameters such as how many channels the designated market includes. Various numbers of receiver circuit modules 104 may be provided.

In addition to the receiver circuit modules 104A-E, back-up receiver circuit modules 106A-E (collectively referred to as 106) may also receive the channel signals. Also, a monitor receiver module 108 may be included at the local collection facility 30.

The receiver circuit modules generally 104, 106 and 108 include a tuner module 110 and a demodulator module 112. The receiver circuit module 104 is used to tune and demodulate the over-the-air signals. The tuner 110 may be fixed-tuned to a particular channel or may be adjustable. The receiver circuit modules 104A-E are suitable for fixed tuning. The monitor receiver circuit module 108 is particularly suited for multi-channel tuning. The receiver circuit modules 104, 106, as will be described below, may be an Advanced Television Systems Committee (ATSC) receiver or a National Television System Committee (NTSC) receiver. In ATSC form the receiver receives the ATSC signal and demodulates it into an MPEG2 signal suitable for distribution over an Internet Protocol (IP) connection and thus may be referred to as an IP signal.

The monitor receiver module 108 may be in communication with an antenna switch 114. The antenna switch 114 is in communication with the antennas 100. The antenna switch 114 may be used to communicate the output of a particular antenna to the monitor receiver decoder 108.

An asynchronous serial interface (ASI) router 120 may also be provided. This is an optional component. The serial interface router 120 may be a high definition serial digital interface router. The router 120 may receive local feeds 118 directly from the local channel providers. The feeds may also be in MPEG2 format. These may be provided through a wire or optical fiber. The router 120 routes the channel signals received from the local feeds 118 to the receiver circuit monitor receiver module 108 where received signals are decoded.

The local collection facility 30 may also include a monitoring integrated receiver decoder (MIRD) 140. The output of the monitoring IRD 140 may be provided to an MIRD encoder 142. The IRD 140 may also be referred to as a set top box. The monitoring IRD 140 receives downlinked satellite signals and converts these signals to a decoded signal (HD SDI, for example). The MIRD encoder 142 encodes the signals in a format such as IP format or MPEG 2 format.

The output of the monitor IRD encoder 142 and the primary receiver may be communicated to a primary IP switch 146. The output of the monitor IRD encoder 142 and the back-up receiver modules 106 may be communicated to a back-up IP switch 148.

Both IP switches 146, 148 route IP signals such as the MPEG2 signals through the IP network 32.

Each of the outputs of the primary receiver modules 104, back-up receiver modules 106, the monitoring IRD 140 and the monitoring receiver 108 may be a monitoring source for the monitoring system 230 described below in FIG. 4. The monitoring system may be used to monitor and control the primary receivers 104, the back-up receivers 106, the antenna switch 114, the monitoring IRD 140 and the monitoring receiver 106. By controlling the multicast group, the proper receiver output is routed through the proper switch and is used as the on-air signal. Switching between primary receivers and back-up receivers will be described below.

Figure 4:
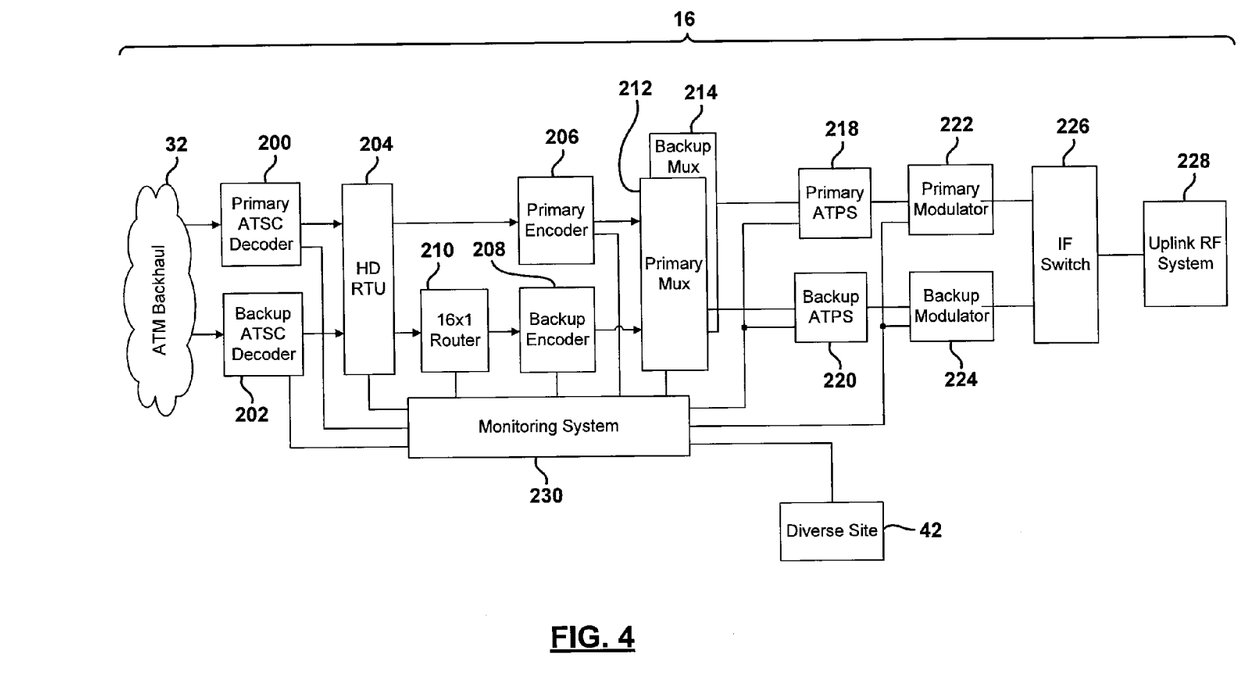
FIG. 4 is a detailed block diagrammatic view of a remote uplink facility.

Referring now to FIG. 4, the IP signals received from the primary switch 146 and the back-up IP switch 148 are routed to a primary ATSC decoder 200 and a back-up ATSC decoder 202. The decoders 200, 202 may decode the ATSC signals MPEG2 signals into an ASI or other serial digital interface signal. It should be noted that, although only one is shown, a separate primary ATSC decoder 200 may be provided for each of the receiver circuit modules 104 in each of the local collection facilities 30. The decoders 200, 202 may also be referred to as MPEG decoders. The decoders may be MPEG2 decoders. Thus, each primary receiver 104 may correspond to a primary decoder 200 and a back-up decoder 202. The output of each decoder 200, 202 is in communication with a receive transfer unit 204. The receive transfer unit 204 may be a high definition receive transfer unit. The receive transfer unit 204 acts as a switch to switch between the primary decoder 200 and the back-up decoder 202. Switching may be commanded at the monitoring system. One output of the receiver transfer unit 204 may be in communication with a primary encoder 206.

A group of channels may share a back-up encoder 208. The router 210 is used to route the output of the RTU 204 to the back-up encoder 208. The RTU output from a plurality of different channels may be provided as an input to the router 210 so that one of the outputs may be selected for the back-up encoder 208.

The output of the primary encoder 206 and the back-up encoder 208 are provided to a primary multiplexer 212 and a back-up multiplexer 214. The output from a plurality of primary encoders for a plurality of different channels may be provided to the primary multiplexer and the back-up multiplexer 212, 214. The encoders 206, 208 may provide the multiplexers signals from various remote local collection facilities.

The multiplexers 212, 214 are used to generate a multiplexed signal that is communicated to a respective primary advanced transport processing system (ATPS) 218 and a back-up advanced transport processing system (ATPS) 220. The advanced transport processing systems 218, 220 convert the multiplexed signals into an advanced transport stream such as a DIRECTV® A3 transport stream. The ATPSs 218, 220 may act as an encryption module for inserting encryption into the transport stream.

A primary modulator 222 and a back-up modulator 224 receive the transport stream from the respective primary ATPS 218 or the back-up ATPS 220. The primary modulator 222 and the back-up modulator 224 modulate the transport stream and generate an RF signal at a frequency such as an L-band frequency. An RF switch 226 may be referred to as an intermediate frequency (IF) switch 226. The RF switch provides one output signal to the uplink RF system 228. The uplink signal may then be communicated to the satellite 12 of FIG. 1. Should the system not be a satellite system, the signal may be communicated terrestrially through a distribution system in a wired or wireless manner. Several circuits 210-226 may be included in a remote facility 16, each one corresponding to one transponder on the satellite.

A monitoring system 230 may be in communication with and monitor and control the decoder 200, 202, the RTU 204, the router 210 the encoders 206,208 and the multiplexers 212, 214 for communicating with the various local collection facilities. In addition, the monitoring system 230 may be in communication with the primary ATPS 218, the back-up ATPS 220, the primary modulator 222 and the back-up modulator 224. The monitoring system 230 may be referred to as an advanced broadcast monitoring system 230.

It should be noted that multiple local collection facilities 30 may be coupled to a remote collection facility 16.

The diverse uplink facility or diverse site 42 illustrated in FIG. 4 may include a primary and back-up ATPS, a modulator and RF switch. The monitoring system 230 may control the signals to the diverse site 42.

Figure 5:
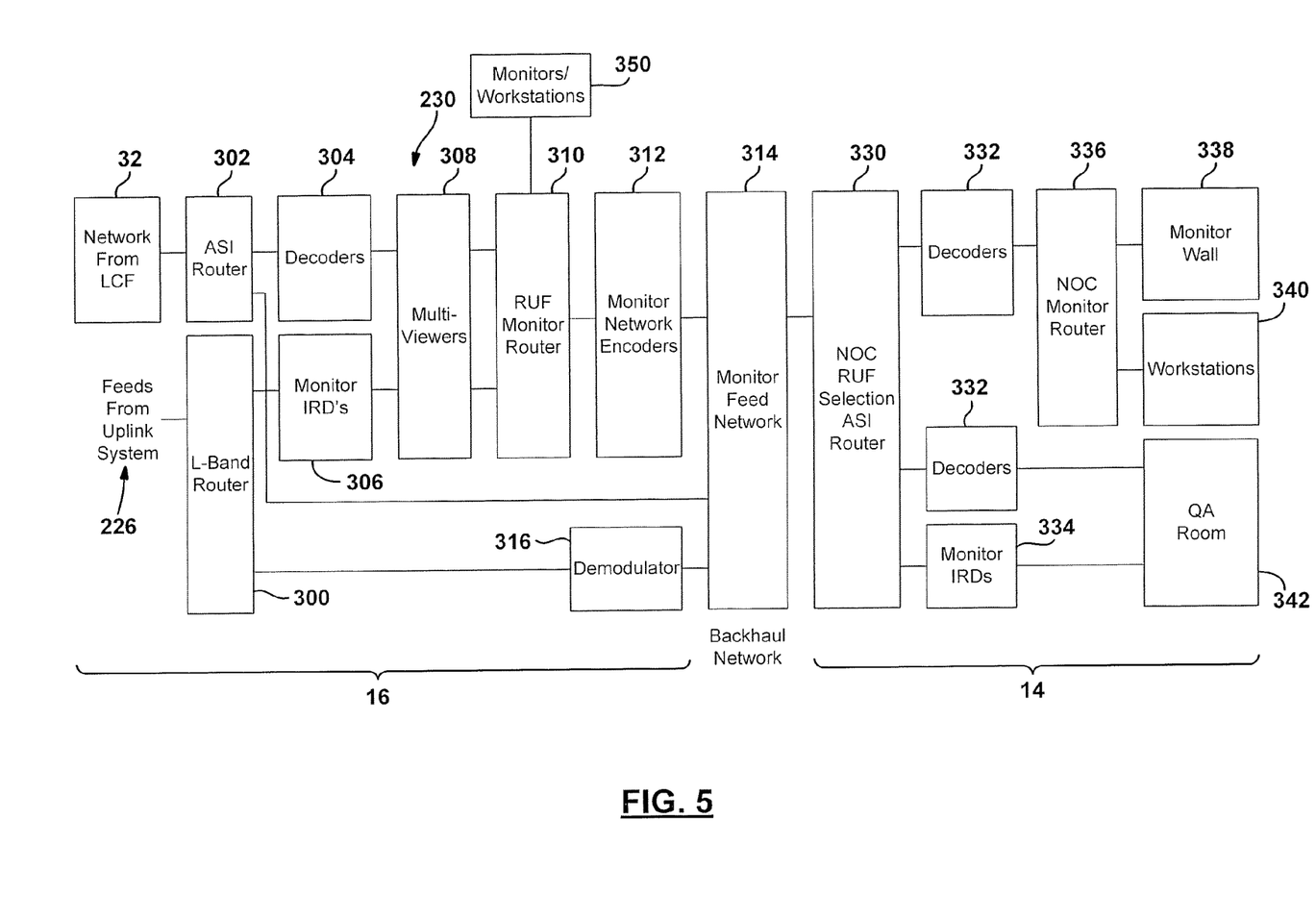
FIG. 5 is a block diagrammatic view of a monitoring system of FIG. 3.

Referring now to FIG. 5, the monitoring system 230 of FIG. 4 is illustrated in further detail. The monitoring system 230 receives signals through the network 32. As mentioned above, feeds from various uplink systems such as various IF switches 226, may be provided to an L-band router 300. An ASI router 302 may be used to route the signals from the local collection facilities to a decoder 304. The decoder may be an ATSC decoder. Decoder 304 may be optional should the signals already be decoded at the local collection facility. The L-band router 300 may be in communication with a monitor IRD 306. The output of the monitor IRD 306 and the decoders 304 are provided to a multi-viewer or plurality of multi-viewers 308. A remote uplink facility monitor router 310 is used to provide signals to the monitor network encoders 312 which in turn provide signals to a monitor feed network 314. The L-band routers may also provide signals to a demodulator 316. The output of the demodulator 316 and the monitor network encoders 312 may be provided to the monitor feed network 314. The monitor feed network 314 may be various types of transmission means used to communicate between the remote uplink facilities 16 and the network operation center 14.

The remote uplink facility 16 may generate monitoring display 350 as well. The monitoring displays 350 may also be used to control the various functions at the local collection facilities. The monitoring displays may be in communication with the monitor router 310.

The network operation center 14 may include an ASI router 330 for the selection of signals from a particular remote uplink facility. The ASI signals may be routed to an ATSC decoder 332 and a monitor IRD 334. The ATSC decoder 332 may provide the signals to a monitor router 336. A monitor wall 338 may be used to generate monitoring signals for use at the network operation center. A workstation 340 may also receive the signals from the network operation center monitor router 336. The ATSC decoders 332 and the monitor IRDs 334 may provide the signals to a quality assurance (QA) room 342. Screen displays at the monitor wall 338, the workstation 340 and the quality assurance room 342 are used for monitoring the various remote uplink facilities. The workstation 340 may also be used for control purposes. Signals are provided to the remote uplink facility and ultimately to the local collection facilities should a problem arise with the signals. Ultimately the control signals may be communicated back through the network 32.

The network operation center 14 may also include multiple workstations 340 as well as a large monitor wall 338. The workstations 340 may have access to various control surfaces that can configure the monitor walls 338 as well as signals fed to the various monitors at the station.

Control of the on-air failure recovery devices as well as the monitoring functions for every LCF and RUF are accomplished through control surfaces such as touch screens and keyboards together with a GUI at the workstations 340 in the network operation center 14. The control surfaces may be application-specific and present the status and control options for various multiple configurations for the application. The quality assurance (QA) room 342 may not have any control functions therein. The monitors 350 may be coupled to the monitor network encoders 315 for displaying various views from the remote uplink facility and the local collection facilities.

The decoders 332 may be MPEG decoders since the signal may be in MPEG form when received from the remote uplink facility.

Figure 6A:
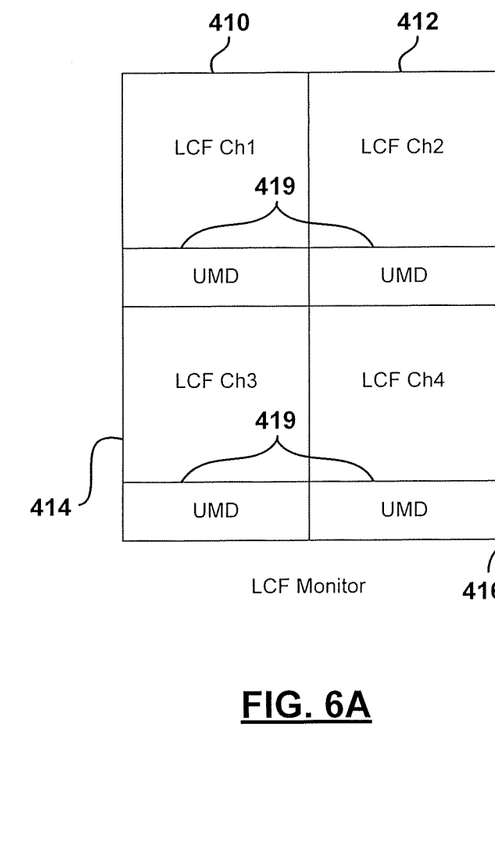
FIG. 6A is a plan view of a local collection receiver monitoring display.

Referring now to FIG. 6A, a local collection facility monitor is generated having four local collection facility channels 410, 412, 414, and 416. Each display may also include an under-monitor display 418 used to identify the particular channel signal. The under-monitor displays 418 may display the actual channel number, the station identification or other information and the like.

Figure 6B:
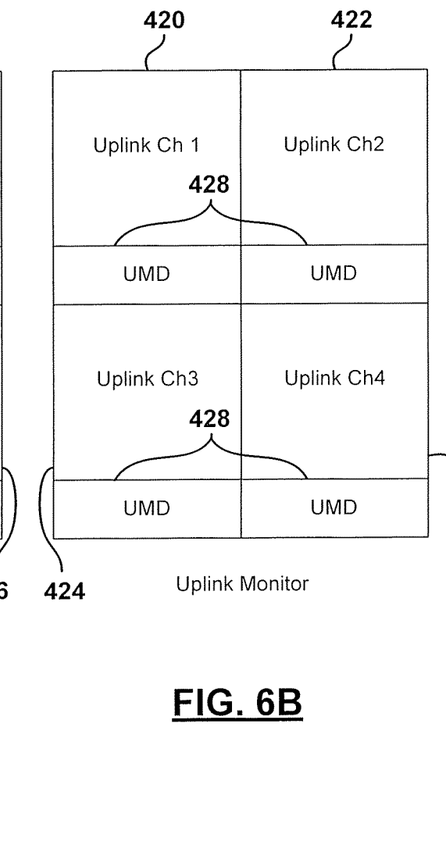
FIG. 6B is a plan view of an uplink monitoring display.

In FIG. 6B, an uplink monitor is illustrated having an uplink channel one 420, an uplink channel two 422, an uplink channel three 424, and an uplink channel four 426. An under-monitor display 428 may also be included with each of the displays 420-426. The uplink channels receive the uplink channel signals so that they may be monitored. The uplink channel signals provide an indication as to the uplink channel. Various selections may be made for the particular uplink channels for the particular remote uplink facilities.

Figure 6C:
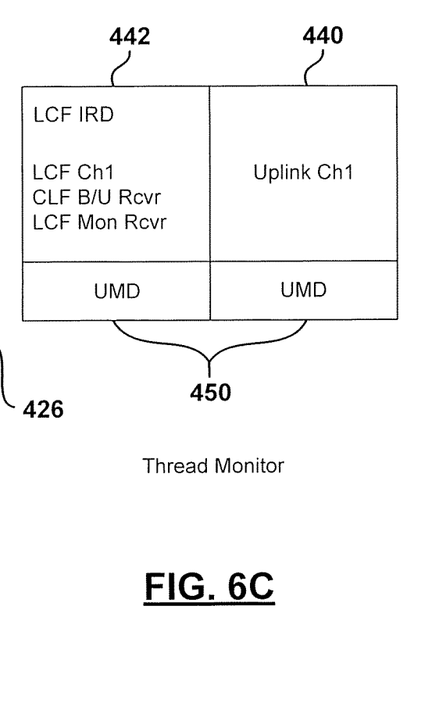
FIG. 6C is a plan view of a thread monitoring display.

FIG. 6C includes an uplink channel signal 440 and a local collection facility IRD signal 442. The local collection facility IRD signal 442 may be received through the monitoring IRD located at the local collection facility. This is illustrated in FIG. 3 as reference numeral 140. The display may also display a channel from the local collection facility, the back-up receiver channel or the local collection facility monitor receiver. Both displays 440 and 442 may include an under-monitor display 450.

Figure 7:
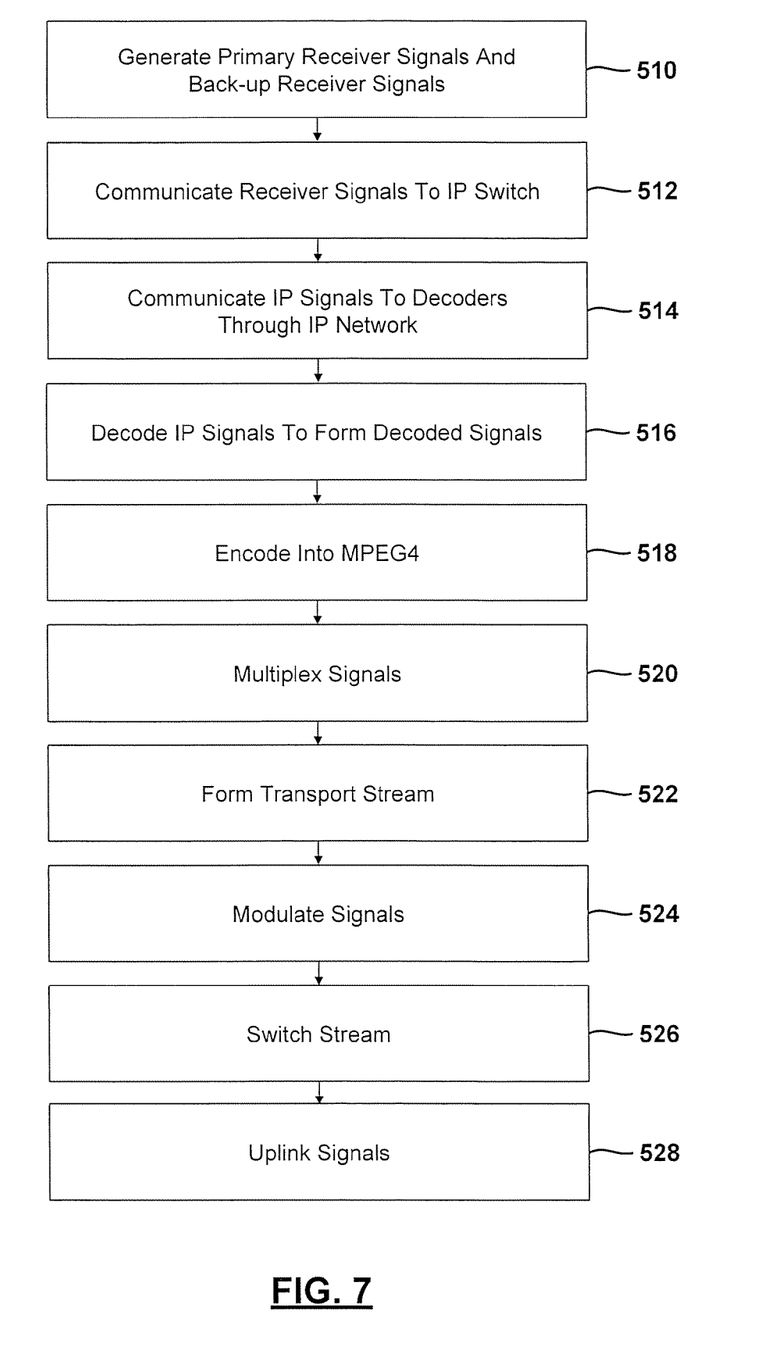
FIG. 7 is a flowchart of a method for operating a local collection facility and remote collection facility.

Referring now to FIGS. 3, 4 and. 7, a method of operating the system illustrated in FIGS. 3 and 4 is illustrated. It should be noted that several local collection facilities and thus a plurality of primary and back-up receivers may be in communication with the remote facility 16. The remote facility 16 may ultimately include a plurality of decoders and encoders for each channel and a back-up encoder that is shared by several channels. The encoder outputs may be multiplexed together.

Step 510 generates primary receiver signals and back-up receiver signals at a local collection facility or a plurality of local collection facilities. The primary receiver signals and the back-up receiver signals may be received through a tuner that is tuned to the channel signal received through the antenna 100 or through a direct cable connection 118. In the receiver, the signal may be demodulated in the demodulator 112. The demodulated signals may be MPEG2 signals that are also IP signals capable of transmission through the IP backhaul 32.

In step 512, the receiver signals are communicated to the IP switches 146, 148. The primary receivers provide signals to the primary IP switch 146. The back-up receivers 106 communicate signals through the back-up IP switch 148.

The IP signal, such as the MPEG2 signals, is communicated through the IP backhaul to a primary decoder 200 or a back-up decoder 202. Each decoder may correspond to a single one of the receivers. The back-up decoders may correspond to one of the back-up receivers. The decoders may be assigned to the multicast group assigned to the corresponding receiver. This may be controlled by the monitoring system.

In step 516, decoded IP signals are formed at the decoder. Both the primary and back-up decoder form decoded signals. The decoded signals are provided to the RTU 204 or switch. The RTU may be controlled to select one of the inputs of the primary decoder 200 or the back-up decoder 202 as its output signal. The output signal of the switch is provided to the primary encoder 206 and to a router 210. The router 210 may be coupled a plurality of RTU outputs so that the back-up encoder 208 may be used for a plurality of different channel signals. In this example, a 16×1 router is used to potentially route one of 16 signals to the back-up encoder 208 upon a failure.

In step 518, the encoders are encoded into an MPEG4 format or other type Of format. The encoded signals are then provided to the multiplexers 212, 214. A plurality of encoded signals from various channels is multiplexed together in step 520.

After multiplexing, a transport stream is formed in the primary advanced transport processing system and the back-up advanced transport processing system. The transport signals are modulated in the primary modulator 222 and the back-up modulator 224 for the respective primary and back-up transport processing systems. The modulator modulates the signal in step 524. In step 526, the IF switch switches between the primary stream or the back-up stream. If errors occur, as determined by the monitoring system 230, one stream or the other stream may be chosen.

In step 526, uplink signals are formed in an uplink RF system in response to the output of the switch 226. The modulated signals are communicated through an RF uplink system to a satellite 228. The system may also be used for non-satellite systems and thus the uplink RF system may provide input to a cable network or an over-the-air system.

Figure 8:
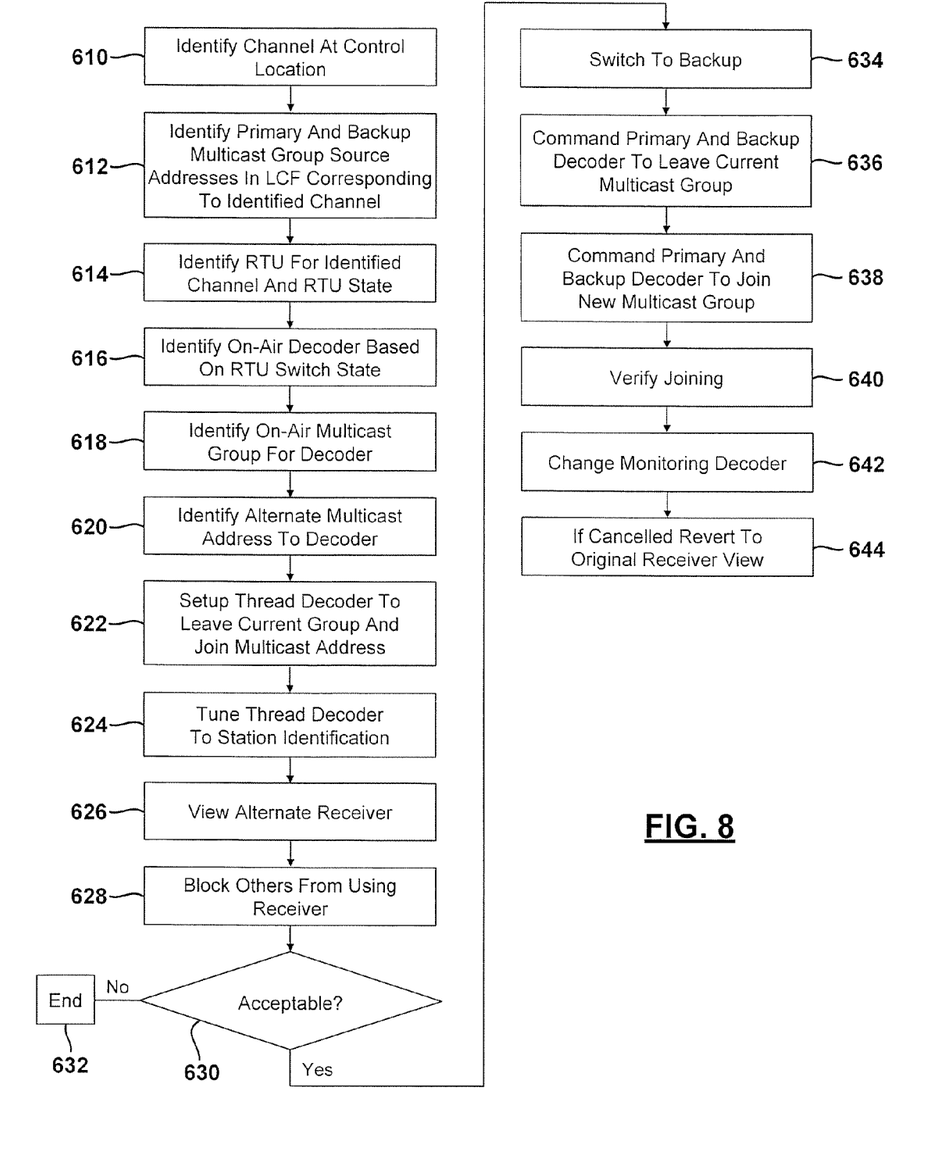
FIG. 8 is a flowchart illustrating a method for controlling a back-up receiver decoder circuit module at the local collection facility from a remote facility.

Referring now to FIG. 8, a method for controlling the switching from a primary receiver circuit module to a back-up receiver module in a local collection facility from a remote facility is illustrated. In step 610, the channel to control is chosen at the control location. This channel will be referred to as a first channel or identified channel. The control location may be the network operation center or the remote uplink facility 16. The channel may be automatically identified by the monitoring system 230.

In step 612, the primary and back-up multicast group source address in the local collection facility corresponding to the channel identified in step 610 is identified. The multicast group may be formed using Internet Group Management Protocol (IGMP) version 3. In step 614, the RTU or switch 204 is identified for the channel in step 610. The state of the RTU is also determined. That is, which output the RTU is providing is determined.

In step 616, the on-air decoder is identified based on the switch state of the RTU. In step 618, the on-air multicast group for the decoder is identified.

In step 620, an alternate multicast decoder address in step 618 is determined. This corresponds to the other decoder such as the back-up decoder if the primary is used or the primary decoder if the back-up is used.

In step 622, a thread decoder in the monitoring system is set-up to monitor the identified channel. The thread decoder of the monitoring console is commanded to leave its current multicast group and join the multicast address for the identified channel. The various decoders and routers are set to route the signals to the screen display associated with the console.

In step 624, the thread decoders are tuned according to the thread decoders for the monitoring system are tuned according to the station identification. In step 626, the monitoring system is used to view the alternate receiver such as the back-up receiver that may be used for the channel. In step 628, other channels are blocked from using the alternate receiver. In step 630, if the signals through the alternate receiver are acceptable or not acceptable, then step 632 ends. This may be performed by the operator determining that the signals are not acceptable or automatically by the operator not responding within a certain amount of time from displaying the alternate channel. In step 634, the process for switching to a back-up channel begins.

In step 636, the primary and back-up decoders are commanded to leave the current multicast group for the channel. In step 638, the primary and back-up decoder are commanded to join the new multicast group corresponding to the back-up receiver. In step 640, a verification signal verifying the joining may be generated and communicated to the monitoring system.

In step 642, the monitoring decoders may be identified and commanded to leave the multicast group currently joined. The monitoring decoders may be tuned to the program identification for the local channel source for the selected monitoring system. The alternate receiver, which is now on the air, should be visible in the local collection facility display in the thread monitor (e.g. 442 of FIG. 6C).

During the process the operator may cancel or revert to the original receiver view in step 644. Thus, the thread decoder may leave the current multicast group and place the still-on-air signal such as the primary signal back to the monitoring system.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of forming an output signal comprising:
   providing a plurality of primary receiver circuit modules at a local collection facility, said plurality of primary receiver circuit modules comprising a first receiver circuit module;
   receiving a plurality of channel signals, said plurality of channel signals having a first channel signal;
   communicating the first channel signal to the first receiver circuit module and a second receiver circuit module;
   forming a first IP signal corresponding to the first channel signal at the first receiver circuit module;
   communicating the first IP signal corresponding to the first channel signal from the local collection facility through an IP network backhaul to a remote facility;
   decoding the IP signal to form a first decoded signal at the remote facility;
   encoding the first decoded signal at a first encoder module into a first encoded signal at the remote facility;
   multiplexing the first encoded signal into a first multiplexed signal at the remote facility; and
   generating the output signal at the remote facility in response to the multiplexed signal;
   providing a plurality of backup receiver circuit modules at the local collection facility, each of said plurality of backup receiver circuit modules corresponding to a respective one of the plurality of primary circuit modules, said plurality of backup receiver circuit modules comprising the second receiver circuit module forming a second IP signal from the first channel signal;
   communicating the second IP signal corresponding to the first channel signal from the local collection facility through the IP network backhaul to a monitoring system of the remote facility simultaneously with the first IP signal;
   displaying the second IP signal at the monitoring system;
   when the second IP signal is acceptable, discontinuing the steps of decoding the first IP signal to form a first decoded signal, encoding the first decoded signal at a first encoder module into a first encoded signal, multiplexing the first encoded signal into a first multiplexed signal and generating the output signal at the remote facility in response to the multiplexed signal;
   thereafter, decoding the second IP signal to form a second decoded signal;
   thereafter, encoding the second decoded signal at the first encoder module into a second encoded signal;
   thereafter, multiplexing the second encoded signal into a second multiplexed signal; and
   thereafter, generating the output signal at the remote facility in response to the second multiplexed signal.

2. A method as recited in claim 1 wherein the step of discontinuing comprises commanding a decoder to discontinue a first multicast group associated with the first receiver circuit.

3. A method as recited in claim 2 wherein commanding a decoder to discontinue comprises commanding a decoder to discontinue from a monitoring system.

4. A method as recited in claim 2 wherein prior to decoding the second IP signal, commanding the decoder to join a second multicast group of the second receiver circuit.

5. A method as recited in claim 2 wherein commanding the decoder to join comprises commanding a decoder to join from a monitoring system.

6. A method as recited in claim 1 wherein prior to communicating the first IP signal, switching the IP signal through a primary IP switch.

7. A method as recited in claim 1 wherein prior to communicating the second IP signal, switching the second IP signal through a backup IP switch.

8. A method as recited in claim 1 wherein communicating the first IP signal from the local collection facility through an IP network backhaul to the remote facility comprises communicating the IP signal from the local collection facility through the IP network backhaul to a primary encoder or a secondary encoder or both at the remote facility.

9. A method as recited in claim 1 wherein generating an output signal comprises forming a transport signal from the multiplexed signal and modulating the transport signal to form a modulated signal.

10. A method as recited in claim 9 further comprising uplinking the modulated signal to a satellite.

11. A method as recited in claim 1 wherein decoding the first IP signal to form a first decoded signal comprises MPEG2 decoding the first IP signal.

12. A method as recited in claim 11 wherein the first decoded signal comprises a high definition serial digital interface signal.

13. A method as recited in claim 1 wherein the first receiver module comprises a demodulator and fixed tuner.

14. A method as recited in claim 1 wherein each of the plurality of receiver circuit modules corresponds to a respective one of the plurality of channels.

15. A method recited in claim 1 wherein the first channel signal comprises a terrestrial over-the air channel signal received through an antenna.

16. A method as recited in claim 1 wherein the first channel signal comprises a high definition terrestrial over-the air channel signal received through an antenna.

17. A method as recited in claim 1 wherein the first channel signal comprises a local channel signal received through wired or optical connection.

18. A method as recited in claim 1 wherein receiving a plurality of channel signals comprises receiving a plurality of channel signals from a designated marketing area.

19. A system comprising:
   a local collection facility comprising;
   a plurality of primary receiver circuit modules comprising a first receiver circuit module and a backup receiver circuit module;
   said first receiver circuit module receiving and demodulating a first channel signal and forming a first IP signal, said first receiver circuit module having a first multicast group;
   said backup receiver circuit module receiving and demodulating the first channel signal and forming a second IP signal, said backup receiver circuit module having a second multicast group;

a remote facility spaced apart from the local collection facility and communicating with the local collection facility through an IP backhaul;

a primary decoder within the remote facility in communication with the IP backhaul forming a decoded signal from the first IP signal, said primary decoder belonging to the first multicast group;

a primary encoder within the remote facility in communication with the primary decoder forming a first encoded signal from the decoded signal;

a multiplexer multiplexing the first encoded signal into a multiplexed signal; and a monitoring system of the remote facility displaying on a display the first IP signal and second IP signal and commanding the primary decoder to join the second multicast group and discontinue the first multicast group;

said primary decoder forming the decoded signal from the second IP signal.

20. A system as recited 19 wherein said monitoring system prior to commanding, previewing the first channel signal through the backup receiver circuit module.

21. A system as recited in claim 19 further comprising a backup decoder, said monitoring system commanding the primary decoder and the backup decoder to join the second multicast group and discontinue the first multicast group.

22. A system as recited in claim 21 wherein the backup decoder forms a second decoded signal from the first IP signal or the second IP signal, and a switch in communication with the primary decoder and the backup decoder selecting forming a switch output signal comprising of one of the first decoded signal or the second decoded signal.

23. A system as recited in claim 22 wherein the switch output signal is communicated to the primary encoder and a router is in communication with a backup encoder.

24. A system as recited in claim 23 wherein said router receiving a plurality of decoded signals corresponding to at least two of the primary receiver circuit modules.

25. A system as recited in claim 19 further comprising a plurality of backup receiver circuit modules at the local collection facility, each of said plurality of backup receiver circuit modules corresponding to a respective one of the plurality of primary circuit modules.

* * * * *